United States Patent Office 3,651,166
Patented Mar. 21, 1972

3,651,166
RECOVERY OF ACIDS AND ORGANIC BASES FROM THEIR MIXTURES
David W. Hall, Vancouver, British Columbia, Canada, assignor to Marathon Oil Company, Findlay, Ohio
No Drawing. Filed Apr. 29, 1968, Ser. No. 725,206
Int. Cl. C07c 1/20
U.S. Cl. 260—681
20 Claims

ABSTRACT OF THE DISCLOSURE

Recovering acids and organic bases from their salts by heating the salt to its dissociation temperature and removing therefrom the acid or base wherein the salt dissociates at a temperature lower than the decomposition temperatures of the acid and base; the acid and base have different volatilities and the salt has a sublimation temperature higher than the dissociation temperature thereof.

The present invention relates to a method for the recovery of acids and organic bases from their mixtures. More particularly, the present invention relates to a method for the recovery of acids and organic bases from their salts.

BACKGROUND OF THE INVENTION

Organic bases such as pyridine, the N-alkyl pyrrolidones, acetamide, dimethylformamide, etc., find many applications in the chemical industry. They are often employed as solvents in the reactions of organometallic reagents, the dehydrohalogenation of alkyl halides to obtain unsaturated materials, the hydrolysis of organic and inorganic halides, etc. Organic bases are also often employed in various reactions as acid scavengers whereby undesirable acid values are effectively removed from reaction media through a salt or complex forming reaction with the organic base. In many of these instances, the processes are rendered commercially unattractive due to the loss of organic base material due to the ease with which they form salts with the acid values present in the various reaction media. Heretofore, no practical method has been suggested for the recovery of these organic base materials from their salts, complexes and mixtures with acids.

An example of a typical process employing an organic base wherein said base is converted to an acid salt is that described in U.S. Patent 3,360,583, Hall et al. That process relates to the production of polyolefinic materials by reacting a haloether with an olefin to form a haloether adduct of the olefin and splitting alcohol and hydrogen halide from the intermediate adduct in the presence of an organic base to form a conjugated polyolefin and the hydrogen halide salt of the organic base. More specifically, chloromethyl methyl ether is reacted with isobutylene to form an intermediate adduct. The adduct is then heated in the presence of N-methyl-2-pyrrolidone to convert the adduct to isoprene. The N-methyl-2-pyrrolidone is simultaneously converted to its hydrogen halide salt.

Obviously, the efficiency and commercial attractiveness of this process would be greatly enhanced if it were possible to recover the organic base and acid values from the salt formed by this reaction. Indeed, the efficiency and commercial attractiveness of any chemical process whereby a salt or complex of the organic base employed therein is produced would be enhanced by a process for recovering the base and acid values from such salts.

BRIEF DESCRIPTION OF THE INVENTION

It is an object of the present invention to provide a process for the recovery of acids and organic bases from their mixtures.

It is a further object of the present invention to provide a process for the recovery of acids and organic bases from their salts or complexes.

It has been found, according to the present invention, that acids and organic bases may be recovered from certain salts and mixtures by heating these salts to their dissociation temperature and continually removing either the thus formed free acid or free organic base.

The process of the present invention is applicable only where the following conditions are met:

(1) The organic base-acid salts or complexes must dissociate appreciably at a temperature lower than that at which decomposition of either, or both, the acid or the organic material takes place.

(2) The free acid and the free organic base must possess sufficiently different volatilities that one can preferentially be removed from the other at the temperature operative for the recovery reaction.

(3) The volatility of the salt itself must be sufficiently low that it does not sublime from the reaction site, thereby preventing its being heated to the temperature required for appreciable dissociation and preventing its contaminating the recovered base and acid values.

Moreover, the invention involves the recovery of the organic base and acid values from those salts described above which are produced as a result of a chemical process in their pure form and recycling these values to the original reaction medium. Alternatively, the organic base and acid values may be recovered and utilized in other applications.

DETAILED DESCRIPTION OF THE INVENTION

Basic organic materials forming salts meeting the above mentioned requirements will, in general, have base constants ($K_b$) of less than about $1 \times 10^{-10}$, as measured in aqueous solution of 20–25° C. The basic organic materials best suited as starting materials for the process of the present invention are the N-alkyl-2-pyrrolidones. N-methyl-2-pyrrolidone is the most preferred starting material because of (1) its high thermal stability, (2) its high degree of stability against hydrolysis, (3) its acid salts and complexes dissociate appreciably at moderate temperatures, and (4) its value as a basic organic solvent and/or reagent in many chemical processes.

Other basic organic materials useful in the present invention include the lower aliphatic amides such as acetamide, acetanilide, N,N-dimethyl acetamide, N,N-dimethyl formamide and the like.

Obviously, the particular basic organic material will depend to a large extent on the acid with which it forms a salt. The above stated general rule for selecting organic basic materials (i.e., that its $K_b$ be equal to or less than about $1 \times 10^{-10}$) is but a rule of thumb for selecting suitable starting materials which satisfy the critical requirements set forth above:

(1) They must dissociate appreciably at a temperature lower than that at which decomposition of either, or both, the acid or the basic organic material takes place;

(2) The free acid and the free organic base should possess sufficiently different volatilities such that one can preferentially be removed from the other and (3) The volatility of the salt itself should be sufficiently low such that it does not sublime from the reaction medium, thereby preventing its being heated to the temperature required for appreciable dissociation.

Thus, although salts of basic organic materials having base constants ($K_b$) of less than about $1 \times 10^{-10}$, will, in general, be operable in the process of the present invention it is possible that certain salts or complexes of organic basic materials having a $K_b$ out side of the indicated range will be operable. Thus, certain salts of pyridine ($K_b = 1.71 \times 10^{-9}$) will be operable in the process of the present invention, whereas certain other salts of pyridine will not be operable. Although pyridine is itself sufficiently volatile to be removed from the reaction medium, the salts thereof will not, in general, dissociate at sufficiently low temperatures to allow recovery of the acid and organic base values. Thus, pyridine is a basic organic material which can be recovered only from very specific types of salts according to the process of the present invention. These salts are those derived from the reaction of pyridine with weak organic acids such as benzoic, naphthoic acid and the like.

Thus, it is not strictly essential that the organic base material comes strictly within the $K_b$ range indicated above; only that the salts of the organic base materials meet the three requirements noted above.

Moreover, special conditions must be maintained when employing certain of the above indicated salts as starting materials. Thus, anhydrous conditions must be maintained when employing certain salts of dimethylformamide inasmuch as most of the acid salts thereof readily hydrolyze in the presence of water. Moreover, it is fairly easily decomposed even under anhydrous conditions at temperature greater than about 110° C. Thus, it is preferable when employing such salts to not only maintain anhydrous conditions but also to carry out the recovery under reduced pressure and/or in the presence of an inert atmosphere or reaction medium. Those starting materials which will require the maintenance of special conditions will be obvious to those skilled in the art. They are those salts or complexes which readily undergo decomposition or hydrolysis, etc. in the presence of water or at elevated temperatures.

The acid residue of the starting salt or complex materials may constitute either organic and inorganic acids. Among the most applicable inorganic acids are HCl, HBr, and HI. HF may be employed if special precautions are taken to prevent the corrosive attack of HF on the apparatus employed and on the materials contained in the reaction media.

Those inorganic acids which oxidize organic materials, especially at elevated temperatures, although operable in the process of the present invention, are best avoided due to their deleterious effect on the values sought to be recovered or other materials contained in the reaction media. Thus, perchloric acid salts of organic bases, although operable, are known to be quite explosive when heated, and are, therefore, usually avoided. Moreover, when employing sulfuric acid as a salt component, the organic base component should not contain reactive groups such as, for example, aryl substituents. Moreover, the sulfuric acid salts employed should dissociate at relatively low temperatures to avoid oxidation and charring of the organic basic component. Generally, sulfuric acid salts are applicable where the organic base has a dissociation constant ($K_b$) of about $1 \times 10^{-13}$ or less.

Generally, any organic acid may be employed as the acidic moiety of the salt material. Obviously, the acid residue should not contain functional groups which will react irreversibly or have a deleterious effect on the organic base material or other components of reaction media when released in free form. Moreover, the organic acids should not contain substituents which will render the acid unstable at elevated temperatures. Suitable organic acids are acetic, chloroacetic, trichloroacetic, valeric, benzoic, naphthoic, picric acids, etc.

The reaction conditions employed are not overly critical to the operation of the process of the present invention. It is only necessary to maintain the aforementioned three requirements, i.e., (1) that the dissociation temperature employed be lower than that at which decomposition of the acid and basic organic material residues takes place, (2) that the temperature employed to separate the acid and basic residues come between the boiling points of the acid and organic base residues and (3) that the sublimation point of the salt itself not be exceeded. Generally, the temperature employed may vary from about 25° C. to about 400° C. (preferably from about 75° C. to about 250° C.). Obviously, the optimum temperature will depend in each instance upon the specific salt employed and upon the pressure in the system.

The pressure employed may vary from about 10 microns to about 10 atmospheres, preferably, from about 100 microns to about 1 atmosphere.

Optionally, the reaction may be carried out in an inert atmosphere to decrease the possibility of oxidative decomposition. Moreover, the reaction may be carried out employing an inert gas "sweep" or "purge" whereby the material to be removed is entrained in the gas and carried away from the reaction site. Nitrogen is a suitable sweep gas. Alternatively, the reaction may be carried out in an inert solvent such as toluene whereby the material to be removed is entrained in the vaporized toluene as the reaction mixture is distilled. These latter techniques enable the employment of lower temperatures and increases the reaction rate.

As mentioned above, the process of the invention is not only applicable to the recovery of acid and basic values from salts of organic base materials, but is also applicable to the recovery of such values from salts produced by or employed in various chemical processes to enable recycling these values to the reaction medium, thereby increasing the overall efficiency of these processes. Thus, the process of the invention is applicable in any chemical process involving the production of or the employment of salts or complexes of organic base materials satisfying the above noted requirements. As examples of such processes there may be mentioned the use of basic organic solvents in reactions of organometallic reagents, the dehydrohalogenation of alkyl halides to obtain unsaturated materials, the hydrolysis of organic and inorganic halides, and the employment of organic base materials as acid scavengers in various reactions.

The process of the present invention is uniquely applicable for the recovery of organic base materials and acid values from the salt materials produced by the process disclosed in U.S. Pat. 3,360,583, Hall et al. Briefly, this process involves the preparation of polyolefinic compounds by reacting a haloether with an olefin to form a haloether adduct of the olefin and splitting hydrogen halide and alcohol from the intermediate adduct in the presence of an organic base to form a polyolefinic compound and the hydrogen halide salt of the organic base material. A specific example of that process involves the preparation of isoprene by reacting chloromethyl methyl ether with isobutylene to form an adduct and splitting HCl and methanol from this adduct by heating the adduct in the presence of N-methyl-2-pyrrolidone to form isoprene and the HCl salt of N-methyl-2-pyrrolidone. The organic base material and acid values of this salt may be separated according to the process of the present invention and recycled to the isoprene producing reaction medium, thereby increasing the overall efficiency of that process. Optionally, these values need not be recycled, but rather, may be stored for other uses or resale.

The following examples are intended to be illustrative and not limitative of the invention the scope of which is defined by the appended claims.

EXAMPLE I

This example illustrates the recovery of HCl and N-methyl-2-pyrrolidone from NMP·HCl dissolved in excess NMP.

The apparatus consisted of a 300 ml. round bottom distillation flask fitted with magnetic stirrer, thermometer, nitrogen inlet tube and 1"×18" Vigreux column. To the Vigreux column was attached a simple distillation head with a water-cooled side arm take-off leading to a receiver. The outlet from the receiver led to a scrubber containing aqueous sodium hydroxide.

To the distillation pot of the above apparatus was added 183 g. of an NMP solution containing 7.8 wt. percent anhydrous HCl. A gentle stream of nitrogen was passed through the system during the run. The mixture was heated at 180° C. for 2.5 hours. At this point, the dilute sodium hydroxide solution in the scrubber gained 7.3 g. indicating that 51% of the HCl initially present in the NMP solution had been separated from that solution.

EXAMPLE II

This example illustrates the recovery of anhydrous HCl from an NMP solution containing water and HCl.

To the apparatus of Example 1 was added water (51.3 g.) and 202.0 g. of an NMP solution containing 7.8 wt. percent HCl. Nearly all the water distilled as the mixture was heated to about 120° C. The last few g. of water and about 10 g. of NMP distilled as the pot temperature was being raised to about 150° C. Nothing further occurred until the pot temperature reached 175–180° C. At this point, anhydrous HCl began to distill and was collected.

EXAMPLE III

Isoprene was prepared according to the following process:

73.9 g. (0.919 mole) of chloromethyl methyl ether (inclusive of 1.7 g. of methylal) is mixed with 1.0 g. of $TiCl_4$ in a pressure equalized dropping funnel. This mixture is added dropwise to 200 g. of isobutylene in a 500 ml. 3 neck round bottom flask fitted with a magnetic stirrer, a thermometer and Dry Ice condenser. The addition is carried out at the reflux temperature of the reaction mixture, initially about −10° C. and toward the end of addition about 0° C. over a period of 2 hours. The reaction mixture is then warmed to room temperature with the concomitant removal of part of the excess isobutylene.

N-methylpyrrolidone (188.7 g.) is then added to the crude reaction product and the resulting mixture heated for three hours at a temperature of 130° C. During this distillation the remaining isobutylene is boiled off and the reflux ratio is adjusted such that intermediate products are continually returned to the reaction flask. In this manner, complete conversion of the 3 - chloro-3-methylbutyl methyl ether to isoprene is achieved. Isoprene (0.818 mole) is obtained. Based on the 0.919 mole of chloromethyl methyl ether employed as a starting material, a 88.7% yield of isoprene is obtained, which does not include recycled intermediates such as methylal and olefin ethers.

The NMP solution containing HCl remaining after converting 3-chloro-3-methylbutyl methyl ether to isoprene contained small amounts of organic polymer, organic tar, water and methanol.

The crude mixture 184.3 g. was added to a distillation pot in an apparatus similar to that described in Example I.

The pressure in the system was reduced to 20–25 mm. Hg and heat was applied to the distillation flask. Two distillation fractions totalling 117.6 g. were collected as the overhead temperature rose to 95° C. and leveled off.

The pressure in the system was lowered to about 0.5 mm. Hg and a third overhead fraction weighing 6.9 was collected. The pot was cooled and weighed. Mechanical loss was 1–2 g. at this point in the NMP recovery. The distillation residue was an oily brown solid at room temperature.

The brown solid was triturated with ether and the mixture was filtered. The solid collected upon filtration weighed 46.6 g. This solid was kept in a desiccator with vacuum attachment (20 mm. Hg pressure) for 48 hours. It lost about 5–6 g. weight during this period (probably free NMP). It was crystalline after this treatment. Infrared analysis of the solid showed it to be about 80% pure NMP·HCl. The infrared analysis suggests the contaminant was the hydrochloride of the hydrolysis product of NMP, gamma-methylaminobutyric acid hydrochloride. The NMP and HCl values in the solid NMP·HCl were then recovered as per Example I.

Analysis of the overhead fractions and the ether washing sample showed 125.8 g. of free NMP recovered. This is roughly 94% of the NMP charged to the isoprene cracking run.

This example shows that impurities, as well as excess basic organic material, may be separated from the salt by distillation at a temperature lower than the dissociation temperature of the salt. Valuable components in the distillate may be recovered by conventional means. Acid sensitive components are reclaimed before free acid is generated from the salt. The charge to the salt decomposition step is greatly reduced in size, thereby facilitating economic recoveries of acidic and basic components of the salt. Excess volatile acid could have been separated from the NMP.HCl just as was the excess volatile base separated in the present example.

EXAMPLE IV

This example illustrates the use of an inert organic solvent to promote removal of anhydrous HCl from NMP·HCl dissolved in NMP.

The feed in this experiment was an authentic sample of NMP residue obtained from an isoprene cracking run. This feed is similar to that described in Example III.

To an apparatus similar to that of Example I was added the NMP solution (599.9 g.) and toluene (93.8 g.). The mixture was heated to about 120° C. At this point, water and methanol impurities present initially formed an azetrope with the toluene; this distilled at an overhead temperature of about 81° C.

Additional toluene was now added slowly and continuously via a dropping funnel.

This procedure was continued until the overhead temperature neared that expected for pure toluene (about 2 hours). The pot reflux temperature was kept near 145° C. by controlling the amount of toluene added. The toluene fractions collected earlier were separated from the methanol-water phase and recycled to the addition funnel. Methanol is readily reclaimed from the water resolution by standard procedures.

When it appeared that all the water and methanol had been removed, another 50–75 g. of toluene was added rapidly to the distillation pot. As the toluene flash distilled, anhydrous HCl also distilled rapidly. The toluene was collected in an ordinary receiver and the clear, colorless HCl in a cold trap. Thus, by distilling an inert organic liquid from an essentially anhydrous solution of NMP.HCl in NMP, anhydrous HCl is removed at a lower than usual temperature. That is, according to this variation on the process, the HCl is removed at 135–145° C. as contrasted with the 165–175° C. normally required. Distillation of toluene and HCl was continued another two hours, with toluene collected overhead being recycled via the dropping funnel. At this point, the pot was cooled and analyzed. The NMP solution now contained only 1.48 wt. percent HCl, some heavy organic tar, some toluene and anhydrous NMP. This residue is ideally suited for further recovery treatment according to the procedure of Example III.

This experiment shows that an inert organic solvent can be used to azeotrope some typical impurities from an NMP solution containing NMP.HCl at a temperature below that where HCl is liberated.

The experiment also shows that distillation of an inert solvent from an essentially anhydrous solution of NMP.HCl in NMP causes anhydrous HCl to separate at a lower temperature, and more rapidly, than usual. Thus, this technique may be used in place of an inert gas purge or vacuum distillation. The inert solvent may be continuously recycled without loss.

EXAMPLE V

This example illustrates the lowering of required operating temperature by intermittent or continuous concentration of the salt.

It has been observed that the temperature at which the volatile acid or base is liberated is a function of the concentration of the salt. Thus, a temperature of about 175° C. is required to cause HCl to distill from an NMP solution which contains around 5% anhydrous HCl. As the HCl concentration is reduced to lower levels during the recovery, the rate of evolution of HCl decreases if the operating temperature is not raised above 175° C. Since higher temperatures lead to more loss of NMP via decomposition, it is not desirable to operate much above 175–185° C., unless care is taken to provide an inert atmosphere.

It has been found that an NMP solution containing around 10% HCl will begin to liberate HCl at around 150° C. It must be borne in mind that the pure salt, NMP.HCl, is about 26.7 wt. percent HCl. The pure salt will begin to evolve HCl in the range of 100–120° C. at one atmosphere.

On the basis of the above, it is clear that the nearer the feed in the recovery unit resembles the pure salt in composition, the lower will be the required temperature and the higher will be the rate of evolution of the acid and base components. It is desirable, therefore to carry out the recovery of bases and acids from dilute solutions as follows:

The dilute solution is charged to the apparatus of Example I. The pressure is reduced in the system to a point where either the excess acid or base component distills at a temperature below that at which the dissociation is so extensive that both components codistill. The pure excess acid or base component is recovered. The nearly pure salt residue is then heated to the point at which dissociation occurs. Reduced pressure may be maintained or not, as the particular situation demands. Pure acid or base component is distilled from the salt until the evolution rate decreases to an impractically low level. At this point, the distillation residue now resembles the initial feed. That is, there is a dilute solution of salt in either pure excess acid or base. The excess acid or base is again separated at reduced pressure at a temperature below the dissociation temperature of the salt.

It is obvious that the intermittent technique described above can be adapted to a continuous process. One would need only to take a portion of the feed continuously from the reactor used for the salt dissociation reaction and feed it to a vacuum or other suitable unit for separation of excess pure acid or base from salt. The salt concentrate from this unit would be continuously removed and fed to the salt dissociation reactor.

What is claimed is:

1. A process for the recovery of a hydrogen halide and organic bases from their salts comprising heating said salt to its dissociation temperature and removing therefrom at leat one member selected from the group consisting of said hydrogen halide and said organic base wherein:
    (a) said salt dissociates at a temperature lower than the decomposition temperatures of said hydrogen halide and said organic base,
    (b) said hydrogen halide and said organic base have different volatilities and
    (c) said salt has a sublimation temperature higher than the dissociation temperature thereof.

2. The process of claim 1 conducted in the presence of an inert atmosphere.

3. The process of claim 1 conducted in the presence of an inert solvent.

4. The process of claim 1 wherein said organic base has a base constant ($K_b$) of less than about $1 \times 10^{-10}$.

5. The process of claim 1 wherein said organic base is selected from the group consisting of N-alkyl-2-pyrrolidones, pyridine, acetamide, acetanilide, N,N-dimethyl-acetamide and N,N-dimethyl-formamide.

6. The process of claim 1 wherein said organic base is N-methyl-2-pyrrolidone.

7. The process of claim 1 wherein said recovery is performed under anhydrous conditions.

8. The process of claim 1 wherein said recovery is performed under conditions of reduced pressure.

9. The process of claim 1 wherein said acid is HCl.

10. The process of claim 1 wherein said salt is heated to a temperature in the range of from about 25° C. to about 400° C.

11. The process of claim 1 wherein said salt is heated at a pressure in the range of from about 10 microns to about 10 atmospheres.

12. The process of claim 1 wherein aid organic base and said hydrogen halide are separated by distillation.

13. A process for the recovery of N-methyl-2-pyrrolidone and HCl from their salt comprising heating said salt to its dissociation temperature and removing therefrom a member selected from the group consisting of HCl and N-methyl-2-pyrrolidone.

14. In a process employing an organic base wherein said base is at least partially converted to a hydrogen halide salt, the improvement comprising recovering said hydrogen halide and said organic base from said salt by heating said salt to its dissociation temperature and removing therefrom at least one member selected from the group consisting of said hydrogen halide and said organic base wherein:
    (a) said salt dissociates at a temperature lower than the decomposition temperatures of said hydrogen halide and said organic base,
    (b) said hydrogen halide and said organic base have different volatilities and
    (c) said salt has a sublimation temperature higher than the dissociation temperature thereof.

15. The process of claim 14 wherein at least one member selected from the group consisting of said organic base and said hydrogen halide is recycled.

16. In a process for the preparation of polyolefinic compounds comprising reacting a haloether with an olefin to form a haloether adduct of said olefin, splitting hydrogen halide and alcohol from said adduct in the presence of an organic base to form a polyolefinic compound and wherein said organic base is converted to a salt of said hydrogen halide, the improvement comprising recovering said organic base and said hydrogen halide from said salt by heating said salt to its dissociation temperature and removing therefrom at least one member selected from the group consisting of said hydrogen halide and said organic base wherein:
    (a) said salt dissociates at a temperature lower than the decomposition temperature of said hydrogen halide and said organic base,
    (b) said hydrogen halide and said organic base have different volatilities and
    (c) said salt has a sublimation temperature higher than the dissociation temperature thereof.

17. The process of claim 16 wherein said organic base is recovered and recycled to said process for producing said polyolefinic compound.

18. In a process for the production of isoprene comprising reacting chloromethyl methyl ether with isobutylene to form an adduct and splitting HCl and methanol from said adduct by heating said adduct in the presence of N-methyl-2-pyrrolidone to form isoprene and the HCl salt of said N-methyl-2-pyrrolidone, the improvement comprising recovering said N-methyl-2-pyrrolidone and said HCl from said reaction mixture by heating said mixture to its dissociation temperature and separating N-methyl-2-pyrrolidone therefrom and recycling it to said process for producing isoprene.

19. In a process for the production of isoprene comprising reacting chloromethyl methyl ether with isobutylene to form an adduct and splitting HCl and methanol from said adduct by heating said adduct in the presence of N-methyl-2-pyrrolidone to form the HCl addition salt of N-methyl-2-pyrrolidone, the improvement comprising recovering said N-methyl-2-pyrrolidone and said HCl from said salt by heating said salt to its dissociation temperature until the rate of dissociation decreases while separating evolved HCl and recycling it to said process for producing isoprene, and removing sufficient excess N-methyl-2-pyrrolidone when said rate of dissociation decreases such that dissociation will resume at substantially the original rate.

20. The process of claim 1 wherein said salt is heated to a temperature of from about 75° C. to about 250° C.

References Cited

UNITED STATES PATENTS

| | | | |
|---|---|---|---|
| 3,360,583 | 12/1967 | Hall et al. | 260—681 |
| 3,377,405 | 4/1968 | Hurley et al. | 260—681 |

OTHER REFERENCES

Prill et al., J. Amer. Chem. Soc., vol. 55 (1933), p. 1241.

Elderfield, "Heterocyclic Compounds," vol. 1, pp. 486–487, published by Wiley, New York (1950).

PAUL M. COUGHLAN, JR., Primary Examiner

U.S. Cl. X.R.

260—326.5 FN